(12) United States Patent
Murphy et al.

(10) Patent No.: US 8,034,394 B2
(45) Date of Patent: Oct. 11, 2011

(54) HYDROALCOHOLIC FAT EMULSION AND EMULSIFIER FOR USE THEREIN

(76) Inventors: Michael Laurence Murphy, Fermoy (IE); Timothea Miriam Murphy, Fermoy (IE); Lorcan Michael Murphy, Fermoy (IE)

( * ) Notice: Subject to any disclaimer, the term of this patent is extended or adjusted under 35 U.S.C. 154(b) by 0 days.

(21) Appl. No.: 12/160,925

(22) PCT Filed: Nov. 30, 2007

(86) PCT No.: PCT/EP2007/063104
§ 371 (c)(1),
(2), (4) Date: Jul. 15, 2008

(87) PCT Pub. No.: WO2009/006948
PCT Pub. Date: Jan. 15, 2009

(65) Prior Publication Data
US 2010/0189873 A1 Jul. 29, 2010

(30) Foreign Application Priority Data
Jul. 12, 2007 (IE) .................................. S2007/0505

(51) Int. Cl.
*A23L 1/035* (2006.01)
(52) U.S. Cl. ........ 426/654; 426/656; 426/657; 426/616; 426/573; 426/577; 426/330.3; 426/330.5; 426/520; 426/588; 426/590
(58) Field of Classification Search .................. 426/654, 426/656, 657, 616, 573, 577, 330.3, 330.5, 426/520, 280, 588, 590
See application file for complete search history.

(56) References Cited

U.S. PATENT DOCUMENTS

| | | | | |
|---|---|---|---|---|
| 5,607,714 | A | * | 3/1997 | Connolly ...................... 426/599 |
| 6,828,298 | B2 | * | 12/2004 | Kodama et al. ................ 514/2.4 |
| 2007/0104849 | A1 | * | 5/2007 | McClements et al. ........ 426/590 |

FOREIGN PATENT DOCUMENTS

| | | |
|---|---|---|
| AT | 399719 | 7/1995 |
| EP | 0581374 A1 | 2/1994 |
| EP | 1081220 A1 | 3/2001 |
| FR | 2325329 | 4/1977 |
| GB | 2261676 | 5/1993 |
| JP | 57065176 | 4/1982 |
| NL | 9001881 | 3/1992 |
| WO | 97/05272 | 2/1997 |

OTHER PUBLICATIONS

Akhtar et al., "Whey protein-maltodextrin conjugates as emulsifying agents: An alternative to gum arabic," *Food Hydrocolloids*, 21 (2007) 607-616.

Einhorn-Stoll et al., "Formation of milk protein-pectin conjugates with improved emulsifying properties by controlled dry heating," *Food Hydrocolloids*, 19 (2005) 329-340.

International Search Report and the Written Opinion of the International Searching Authority, mailed Apr. 14, 2008 for PCT/EP2007/063104 (15 pgs.).

Examination Report from EPO dated Apr. 24, 2009 for EP 07847620 (4 pgs.).

Sheet 4 of the International Search Report and the Written Opinion of the International Searching Authority, mailed Apr. 14, 2008 for PCT/EP2007/063104 (15 pgs.), discussing at paragraph 2.10 the portions of FR 2325329 (document D10 in the ISR) in English.

* cited by examiner

*Primary Examiner* — Anthony Weier
(74) *Attorney, Agent, or Firm* — K&L Gates LLP

(57) ABSTRACT

A hydroalcoholic fat emulsion having at least 1% alcohol by volume and at least 1% fat by weight and an emulsifier is shown. The invention also relates to an emulsifier suitable for use in a hydroalcoholic fat emulsion, wherein the emulsion has at least 1% alcohol by volume and at least 1% fat by weight. The emulsifier is a glycoprotein which has at least one protein and at least one carbohydrate covalently bonded and the invention further relates to the use of the glycoprotein as an emulsifier in a hydroalcoholic fat emulsion.

20 Claims, No Drawings

HYDROALCOHOLIC FAT EMULSION AND EMULSIFIER FOR USE THEREIN

CROSS-REFERENCE TO RELATED APPLICATIONS

This application is the national phase of International (PCT) Patent Application Serial No. PCT/EP2007/063104, filed on Nov. 30, 2007, which claims the benefit of and priority to Irish Patent Application Serial Nos. S2007/0505, filed on Jul. 12, 2007. The disclosure of each of the above patent applications is incorporated by reference herein in its entirety.

INTRODUCTION

The present invention relates to a hydroalcoholic fat emulsion comprising at least 1% alcohol by volume and at least 1% fat by weight and an emulsifier. The invention also relates to an emulsifier suitable for use in a hydroalcoholic fat emulsion.

In the specification the term "hydroalcoholic fat emulsion" refers to an emulsion which comprises alcohol and fat in the form of an oil-in-water and alcohol emulsion. In the specification the term "by weight" refers to the weight of the hydroalcoholic fat emulsion, except where otherwise specified. The term "alcohol by volume" refers to the volume of alcohol in the emulsion. To convert alcohol by weight to alcohol by volume the weight value is divided by the specific gravity of alcohol (0.7892 at 20° C.).

In the specification the term "emulsion" refers to a mixture of two immiscible substances. One of the substances which is referred to as the dispersed phase is dispersed in the other substance referred to as the continuous phase. Emulsions are unstable mixtures and do not form spontaneously, thus, in order to mix the continuous and dispersed phases and form the emulsion, an energy input is required. This energy can be applied by any of shaking, stirring, homogenising, spray processing, high pressure pumping and ultrasonic emulsification for example. Over time however, the emulsions formed tend to revert to the stable state of separate oil and water layers. Surface active substances, also known as surfactants can increase the kinetic stability of emulsions greatly so that, once formed, the emulsion does not change significantly in long term storage.

Examples of hydroalcoholic fat emulsions include but are not limited to cream liqueurs, cream based cocktails, alcoholic floating creams, carbonated alcoholic creams and other carbonated fat based products, and pressurised alcoholic creams. The fat component within the hydroalcoholic fat emulsion is generally immiscible with the alcohol and any other water-based components contained therein. Additionally, due to the polarity of alcohol, its presence further exacerbates the instability of the hydroalcoholic fat emulsion thus necessitating the addition of one or more emulsifying agents to allow miscibility and to maintain a stable emulsion for long term storage.

Many emulsifiers are available which are suitable for emulsifying fat containing emulsions. Casein is made up of a number of micelles which have a positive charge thus causing the micelles to form a colloid suspension in a solution of neutral pH and to enrobe fat globules and keep them suspended in the water phase. Although, casein has been found to have some suitability in hydroalcoholic emulsions, it has been found to be generally unsuitable for emulsions with high fat and alcohol levels. Additionally, at a pH of less than 6.6 casein generally falls out of the colloid suspension with the loss of most of its emulsification abilities.

Whey proteins interact with fat globules in a similar way, however they are considered to have even less efficient emulsifying properties than casein. Furthermore, the emulsifying ability of whey proteins declines under acidic conditions and the whey proteins can also form weak gels under these conditions.

Soy protein, rice proteins and other plant proteins are used in a variety of foods such as salad dressings, soups, imitation meats, frozen desserts. They are primarily globulin proteins and are used extensively for their nutritional profile, emulsification and texturising. Their use under acid conditions however is limited as they quickly precipitate. Egg proteins are known to denature under mild heat or acid conditions and thus would be unsuitable for use in hydroalcoholic emulsions.

The above protein emulsifiers are also generally required in the amount of at least 3% by weight of the emulsion in order to effectively emulsify the emulsion. These protein emulsifiers however have been found to cause thickening and thus increase the viscosity of the resultant emulsion and are unsuitable for certain products. For example a 3% addition of caseinate generally gives the emulsion a viscosity of around 35 cP. Additionally, as proteins in general are costly, the use of proteins as emulsifiers is an expensive consideration in food and beverage production.

Other non-protein emulsifiers such as sucrose esters and lecithin are also available, however these emulsifiers have been found to be ineffective in maintaining stable emulsions over long term storage.

Thus there is a need for an emulsifier suitable for hydroalcoholic fat emulsions and in particular hydroalcoholic fat emulsions comprising high alcohol and fat contents and acidic environments.

STATEMENTS OF INVENTION

According to the invention, there is provided a hydroalcoholic fat emulsion comprising at least 1% alcohol by volume and at least 1% fat by weight and an emulsifier;
characterised in that;
the emulsifier is a glycoprotein which comprises at least one protein and at least one carbohydrate covalently bonded.

Glycoproteins have been found to be particularly suitable for use as emulsifiers in hydroalcoholic fat emulsions and specifically have the ability to withstand alcoholic conditions and to maintain stability under these conditions such that they can emulsify the fat globules with the alcohol and other water based components thus stabilising the emulsion. Additionally due to the effectiveness of glycoproteins as emulsifiers, other commercial emulsifiers which provide long term storage are not required, thus reducing the cost of the overall emulsion as well as obviating the need for any artificial emulsifiers.

Ideally, the emulsion comprises in the range of between 0.01% and 10% of the glycoprotein by weight.

Preferably, the glycoprotein comprises no greater that 6% protein by weight. Further preferably, the glycoprotein comprises no greater that 2% protein by weight. The glycoprotein has been found to retain emulsifying ability at low protein contents thus reducing the overall cost of the emulsifier and resultant emulsion.

In one embodiment of the invention, the emulsion comprises at least 5% alcohol by volume. In another embodiment of the invention, the emulsion comprises at least 10% alcohol by volume. In a further embodiment of the invention, the emulsion comprises at least 5% fat by weight. In a still further embodiment of the invention, the emulsion comprises at least 10% fat by weight. Preferably, the emulsion comprises between 10% and 20% alcohol by volume and between 10% and 25% fat by weight. Glycoproteins have been found to retain their emulsifying ability at high alcohol and fat contents and thus are suitable for use in emulsions of this type.

Further preferably, the emulsion has a viscosity in the range of between 5 and 70 centipoises. A further advantage of using a glycoprotein as an emulsifier is that the resultant emulsion can have a wider range of viscosities and thus textures. Specifically, the glycoprotein has a lower viscosity than other emulsifiers and thus its addition to emulsions does not adversely affect the viscosity of the resultant emulsion. Additionally, as the use of glycoproteins allows the addition of greater amounts of fat to the emulsion, high viscosity emulsions can also be prepared.

Preferably, the emulsion has a pH of 7 or less. In one embodiment of the invention, the emulsion further comprises an acidulate. In this embodiment of the invention, the acidulate is selected from the group comprising one or more of fruit juice, organic acid and inorganic acid. A further advantage of glycoproteins is that they can maintain the ability under acidic and salt conditions to emulsify and stabilise the fat globules in the hydroalcoholic fat emulsion. This allows the development of hydroalcoholic fat emulsions with acidulates and the use of these glycoproteins in carbonated emulsions, therefore providing greater scope for producing emulsions with a wider range of flavours.

According to the invention, there is also provided an emulsifier suitable for use in a hydroalcoholic fat emulsion, wherein the emulsion comprises at least 1% alcohol by volume and at least 1% fat by weight;
  characterised in that;
  the emulsifier is a glycoprotein which comprises at least one protein and at least one carbohydrate covalently bonded.

Preferably, the protein to carbohydrate ratio is in the region of between 1:1 and 1:24. Further preferably, the protein to carbohydrate ratio is in the region of between 1:1 and 1:4.

Preferably, the protein is selected from the group comprising one or more of milk, plant or egg protein. Further preferably, the carbohydrate is selected from the group comprising one or more of simple sugars, monosaccharides, disaccharides and polysaccharides.

In one embodiment of the invention, the glycoprotein comprises α-lactalbumin derived from whey protein and hydrolysed guar gum covalently bonded. This glycoprotein has been found to have particularly effective emulsifying properties.

In another embodiment of the invention, the glycoprotein comprises β-lactoglobulin derived from whey protein and hydrolysed guar gum covalently bonded. This particular glycoprotein has been found to have excellent foaming properties.

In a further embodiment of the invention, the glycoprotein comprises whey protein isolate and maltodextrin covalently bonded. This protein is also an effective emulsifier and is also cheaper than some of the other glycoproteins due to the lower cost of the whey protein isolate.

In one embodiment of the invention, the emulsion comprises at least 5% alcohol by volume. In another embodiment of the invention, the emulsion comprises at least 10% alcohol by volume. In a further embodiment of the invention, the emulsion comprises at least 5% fat by weight. In a still further embodiment of the invention, the emulsion comprises at least 10% fat by weight. Preferably, the emulsion comprises between 10% and 20% alcohol by volume and between 10% and 25% fat by weight.

Further preferably, the emulsion has a pH of 7 or less. In one embodiment of the invention, the emulsion further comprises an acidulate. In this embodiment of the invention, the acidulate is selected from the group comprising one or more of fruit juice, organic acid and inorganic acid.

According to the invention, there is further provided the use of a glycoprotein, comprising at least one protein and at least one carbohydrate covalently bonded, as an emulsifier in a hydroalcoholic fat emulsion, wherein the emulsion comprises at least 1% alcohol by volume and at least 1% fat by weight.

Preferably, the protein to carbohydrate ratio is in the region of between 1:1 and 1:24. Further preferably, the protein to carbohydrate ratio is in the region of between 1:1 and 1:4.

Preferably, the protein is selected from the group comprising one or more of milk, plant or egg protein. Further preferably, the carbohydrate is selected from the group comprising one or more of simple sugars, monosaccharides, disaccharides and polysaccharides.

In one embodiment of the invention, the glycoprotein comprises α-lactalbumin derived from whey protein and hydrolysed guar gum covalently bonded. In another embodiment of the invention, the glycoprotein comprises β-lactoglobulin derived from whey protein and hydrolysed guar gum covalently bonded. In a further embodiment of the invention, the glycoprotein comprises whey protein isolate and maltodextrin covalently bonded.

In one embodiment of the invention, the emulsion comprises at least 5% alcohol by volume. In another embodiment of the invention, the emulsion comprises at least 10% alcohol by volume. In a further embodiment of the invention, the emulsion comprises at least 5% fat by weight. In a still further embodiment of the invention, the emulsion comprises at least 10% fat by weight.

Preferably, the emulsion comprises between 10% and 20% alcohol by volume and between 10% and 25% fat by weight.

Further preferably, the emulsion has a pH of 7 or less. In one embodiment of the invention, the emulsion further comprises an acidulate. In this embodiment of the invention, the acidulate is selected from the group comprising one or more of fruit juice, organic acid and inorganic acid.

DETAILED DESCRIPTION OF THE INVENTION

In the specification the term "glycoprotein" refers to the product of one or more proteins and one or more carbohydrates covalently bonded. Glycoproteins occur in nature and form the basis for a large amount of organic structures. Glycoproteins can be obtained commercially, alternatively, the glycoprotein can be prepared by dissolving at least one protein and at least one carbohydrate in deionised water to form a protein-carbohydrate solution, drying the protein-carbohydrate solution to form protein-carbohydrate dry matter, and heating the protein-carbohydrate dry matter in a humidity controlled environment to form the glycoprotein.

The protein to carbohydrate ratio in the protein-carbohydrate solution should be between 0.6:1 and 1:24 and preferably between 1:1 and 1:8.

Prior to drying the protein-carbohydrate solution, the pH of the solution can be modified. The reason for modifying the pH is that it can cause the protein to change its structural conformation thus increasing the amount of reactive amine groups available for reaction with the reducing end of the carbohydrate thereby improving the yield of the glycoprotein and its resultant emulsifying abilities.

Any suitable method of drying such as freeze drying or spray drying could be used. In the case of freeze drying, the protein carbohydrate solution is rapidly frozen to give small ice crystals with a consistent structure. The resultant solution is then freeze dried at low pressures. This method has been found to be preferable as it keeps the solution in a low energy state thus during drying there is less interference of the electrostatic interaction between the anine groups of the protein and the reducing ends of the carbohydrate. The end product is a dry cake with the same volume as the original sheet or granules of the frozen solution.

In the case of spray drying, the solution is heated to a desired temperature which would be dependent on the type of proteins used and spray dried to a powder. The dry matter removed from the dryer will be an evenly dispersed closely intermingled mixture of the materials which will be in the form of a powder. In spray drying, the mild ionic attraction of the amine groups of the proteins with the carbonyl groups of the carbohydrates is disrupted by the molecular vibration of the particles caused by the energy used in drying the solution.

Once dried, the resultant cake or granules are then heated in a humidity controlled environment facilitating the maillard reaction which causes the chemical bonding of the amine group of the amino acids of the protein and the reducing end (the carbonyl group) of the carbohydrate. The best results have been observed by heating the dry matter at temperatures between 50° C. and 80° C. at a relative humidity of between 65% and 85%. The processing conditions and duration of heating may be varied to maximise the yield and functional properties of the glycoprotein.

In the specification, the term "protein" refers to any material comprising amino acids and can refer to any of amino acids, peptides and proteins. The proteins suitable for preparing the emulsifier could be any type of milk, plant or egg protein. Examples of suitable proteins include caseinates, egg protein such as ovalbumin, conalbumin, ovomucoid, lysozyme, ovomucin and phosvitin, whey proteins including alpha($\alpha$)-lactalbumin and beta($\beta$)-lactoglobulin, pea protein, soy protein, rice protein and other plant protein. Examples of individual amino acids which could be used are lysine, cysteine, and histadine. A peptide such as E-polylysine could be used. It is envisaged however, that proteins would be more frequently used as they are more readily available and are less costly than peptides or amino acids.

In the specification, the term "carbohydrate" refers to any material comprising sugars, and can refer to any of simple sugars, monosaccharides, disaccharides and polysaccharides. Examples of effective carbohydrates that could be used are maltodextrins, starches, lactose, galactose, fructose, sucrose, arabinose etc., guar gum, fenugreek gum, gum Arabic, locust bean gum, xanthan gum, dextran gum, gellan gum, gum ghatti, gum tragacanth, gum karaya, gum tra, carob gum and tara gum, microcrystalline cellulose, carboxymethylcellulose, hydroxypropyl cellulose, chitosan, Kappa, Iota and Lambda carrageenans, pectins, agars, and alginates.

The types of proteins and carbohydrates chosen can be tailored for the specific emulsion. For example, whey proteins are soluble under acidic conditions but they lose much of their emulsification ability under these conditions. Hydrolysed guar gum has the beneficial effects of a galactomannan, such as solubility and emulsion stabilisation but lacks the high viscosity associated with galactomannans.

The reason that these glycoproteins demonstrate such excellent emulsifying properties is not clear as yet, however it is postulated that when the emulsion is prepared with a glycoprotein, the hydrophobic regions of the proteins are adsorbed to the surface of the fat globules and the carbohydrates are oriented to the aqueous phase, also the carbohydrate may stabilize the emulsion by covering the fat globules inhibiting coalescence. The carbohydrate may be hydrated in the surrounding water increasing the solubility of the overall glycoprotein.

Table 1 shows example of different types of emulsifiers according to the invention.

TABLE 1

Glycoproteins suitable for use as emulsifiers

| Example | Protein | Ratio | Carbohydrate |
|---|---|---|---|
| No1 CaMd | Sodium Caseinate | 1:2 | Maltodextrin (12DE) |
| No2 WiMd | Whey protein Isolate | 1:2 | Maltodextrin (12DE) |
| No3 WiPn | Whey protein Isolate | 1:3 | Low viscosity HM Pectin |
| No4 BlHg | Beta-lactoglobulin | 1:2 | Hydrolysed Guar Gum |
| No5 SpCm | Soy protein Isolate | 1:3 | Carboxymethylcellulose |
| No6 CaHg | Sodium Caseinate | 1:2 | Hydrolysed Guar Gum |

TABLE 1-continued

Glycoproteins suitable for use as emulsifiers

| Example | Protein | Ratio | Carbohydrate |
|---|---|---|---|
| No7 AlHg | Alpha-lactalbumin | 1:3 | Hydrolysed Guar Gum |
| No8 WiHg | Whey protein Isolate | 1:24 | Hydrolysed Guar Gum |
| No9 AlMd | Alpha-lactalbumin | 1:1 | Maltodextrin (12DE) |
| No10 BlCm | Beta-lactoglobulin | 1:15 | Carboxymethylcellulose |

The emulsions will generally have a pH of 7 or less, depending on the amount of alcohol therein which substitutes other neutral water based liquids thus reducing the pH. In addition to this however, acidulates can also be added to the emulsion and the addition of these acidulates will result in a further reduction in the pH of the emulsion. In the specification the term "acidulate" refers to any type of acidic component and includes any type of fruit juice, other types of acidic liquids such as wines, teas and coffees and both organic and inorganic acids. Organic acids suitable for use include citric acid, malic acid, tartaric acid, succinic acid, lactic acid, gluconic acid, ascorbic acid and other such acids. Inorganic acids suitable for use include phosphoric acid, carbonic acid, hydrochloric acid, sulphuric acid and other such acids.

The hydroalcoholic fat emulsion can also optionally comprise additives such as purees, thickeners, sweeteners, dairy components, buffers and colourings and the emulsifier will also retain stability in the presence of any of these additives.

Additionally, other commercially available emulsifiers and stabilisers can be added to the emulsion to further stabilise the emulsion. Examples of these emulsifiers include glycerol monostearate, sodium stearyl lactylate, calcium stearyl lactylate, sucrose esters, polysorbate, sorbitans, mono and diglycerides of fatty acids or derivatives, lecithin or modified lecithins, polyglycerol esters. Examples of stabilisers that may be used include guar gum, fenugreek gum, gum Arabic, locust bean gum, xanthan gum, dextran, Gellan gum, gum ghatti, gum tragacanth, gum karaya, carob gum and tara gum, microcrystalline cellulose, carboxymethylcellulose, hydroxypropyl cellulose, chitosan, Kappa, Iota and Lambda carragennans, pectins, agars, and alginates.

The emulsion can be prepared by any method suitable for that particular emulsion and the emulsifier can be added at any stage during preparation of the emulsion. As the glycoprotein is also stable under higher temperatures, i.e. up to about 65° C., it can also be added prior to heating of any of the components in the emulsion.

Table 2 shows a standard emulsion which was prepared for stability testing. The emulsion also comprises one of the glycoproteins from Table 1 as the emulsifier. All of the components remain the same with the exception of the glycoprotein.

TABLE 2

Standardised emulsion for stability testing

| Component | % by Weight |
|---|---|
| Glycoprotein | 1.5 |
| Fat/oil component | 16.0 |
| Sugar | 15.0 |
| Alcohol | 13.8 (17% volume) |
| Water | 53.7 |

Citric acid was added dropwise to the emulsions to adjust the pH. A range of pH values were examined from neutral to pH3.5.

The long term storage of each of the emulsions was examined and the results are tabulated in tables 3 and 4.

TABLE 3

Long term storage fat globule stability

| Date | Glycoprotein | | | | | | | | | |
|---|---|---|---|---|---|---|---|---|---|---|
| | No1 | No2 | No3 | No4 | No5 | No6 | No7 | No8 | No9 | No10 |
| Day 1 | 0.95 | 1.15 | 1.3 | 0.83 | 1.41 | 0.91 | 0.74 | 1.60 | 1.06 | 1.45 |
| Day 2 | 0.97 | 1.28 | 1.2 | 0.82 | 1.46 | 0.87 | 0.73 | 2.20 | 1.16 | 3.10 |
| Day 5 | 1.12 | 1.31 | 1.6 | 0.90 | 1.55 | 0.92 | 0.78 | 4.13 | 1.15 | 4.92 |
| Day 10 | 1.11 | 1.30 | 1.74 | 0.84 | 1.63 | 0.95 | 0.76 | split | 1.23 | split |
| Day 20 | 1.19 | 1.34 | 1.76 | 0.92 | 1.86 | 0.93 | 0.79 | | 1.25 | |
| Day 30 | 1.23 | 1.30 | 2.19 | 0.85 | 2.17 | 0.96 | 0.81 | | 1.27 | |
| Day 60 | 1.34 | 1.40 | 3.41 | 0.89 | 2.81 | 0.97 | 0.78 | | 1.25 | |

All fat sizes were measured on a Sympatec Helos laser diffraction

The X=90 measurement was taken as a comparative measurement

All samples were adjusted to pH4

TABLE 4

Long term storage appearance test

| | Glycoprotein | | | | | | | | | |
|---|---|---|---|---|---|---|---|---|---|---|
| Date | No1 O/A | No2 O/A | No3 O/A | No4 O/A | No5 O/A | No6 O/A | No7 O/A | No8 O/A | No9 O/A | No10 O/A |
| Day 1 | S/S | S/S | S/S | S/S | S/S | S/S | S/S | S/S | S/S | S/S |
| Day 2 | S/S | S/S | S/S | S/S | S/S | S/S | S/S | S/S | S/S | I/S |
| Day 5 | S/S | S/S | S/S | S/S | S/S | S/S | S/S | I/S | S/S | I/I |
| Day 10 | S/S | S/S | S/S | S/S | S/S | S/S | S/S | I/I | S/S | I/I |
| Day 20 | S/S | S/S | S/S | S/S | I/S | S/S | S/S | I/I | S/S | I/I |
| Day 30 | S/S | S/S | S/S | S/S | I/S | S/S | S/S | I/I | S/S | I/I |
| Day 60 | S/S | S/S | I/S | S/S | I/I | S/S | S/S | I/I | S/S | I/I |

O = Oven sample (45° C.), A = Ambient, S = Stable, I = Instable
All samples were adjusted to pH 4

Tables 5 to 15 show examples of different types of emulsions which have been prepared according to the invention

TABLE 5

| Component | % by Weight |
|---|---|
| Glycoprotein No4 (BlHg) | 1.5 |
| Fat/oil component | 16.0 |
| Sugar | 10.0 |
| Alcohol | 13.5 (17% volume) |
| Fruit Juice | 30.0 |
| Water | 29.0 |

TABLE 6

| Component | % by Weight |
|---|---|
| Glycoprotein No4 (BlHg) | 1.5 |
| Fat/oil component | 25.0 |
| Sugar | 10.0 |
| Alcohol | 13.5 (17% volume) |
| Fruit Juice | 30.0 |
| Water | 20.0 |

TABLE 7

| Component | % by Weight |
|---|---|
| Glycoprotein No4 (BlHg) | 1.5 |
| Fat/oil component | 40.0 |
| Sugar | 10.0 |
| Alcohol | 13.5 (17% volume) |
| Fruit concentrate | 6.0 |
| Stabiliser (cmc) | 0.20 |
| Water | 28.8 |

TABLE 8

| Component | % by Weight |
|---|---|
| Glycoprotein No3 (WiPn) | 1.0 |
| Fat/oil component | 16.0 |
| Alcohol | 17.36 (22% volume) |
| Sugar | 16.0 |
| Water | 50.36 |

TABLE 9

| Component | % by Weight |
|---|---|
| Glycoprotein No3 (WiPn) | 1.0 |
| Fat/oil component | 16.0 |
| Alcohol | 19.73 (25% volume) |
| Sugar | 16.0 |
| Water | 47.27 |

TABLE 10

| Component | % by Weight |
| --- | --- |
| Glycoprotein No3 (WiPn) | 1.0 |
| Fat/oil component | 20.0 |
| Alcohol | 19.73 (25% volume) |
| Sugar | 16.0 |
| Water | 43.27 |

TABLE 11

| Component | % by Weight |
| --- | --- |
| Glycoprotein No3 (WiPn) | 1.5 |
| Fat/oil component | 25.0 |
| Alcohol | 19.73 (25% volume) |
| Sugar | 16.0 |
| Xanthan Gum | 0.08 |
| Water | 37.69 |

TABLE 12

| Component | % by Weight |
| --- | --- |
| Glycoprotein No3 (WiPn) | 1.7 |
| Fat/oil component | 16.0 |
| Alcohol | 21.31 (27% volume) |
| Sugar | 16.0 |
| Xanthan Gum | 0.07 |
| Water | 44.92 |

TABLE 13

| Component | % by Weight |
| --- | --- |
| Glycoprotein No4 (BlHg) | 1.0 |
| Fat/oil component | 8.0 |
| Sugar | 17.5 |
| Alcohol | 13.5 (17% volume) |
| Flavouring | 0.7 |
| Thickener (Gellan Gum) | 0.25 |
| Maltodextrin | 4.0 |
| Emulsifier(sucrose esters) | 0.17 |
| Water | 57.58 |

TABLE 14

| Component | % by Weight |
| --- | --- |
| Glycoprotein No1 (CaMd) | 1.4 |
| Cream at 48% fat | 33.34 |
| Sugar | 17.0 |
| Alcohol | 13.5 (17% volume) |
| Emulsifier(SSL) | 0.3 |
| Thickener(xanthan gum) | 0.05 |
| Maltodextrin | 2.5 |
| Buffer (Trisodium citrate) | 0.2 |
| Water | 31.71 |

TABLE 15

| Component | % by Weight |
| --- | --- |
| Sodium Caseinate | 3.5 |
| Cream at 48% fat | 33.34 |
| Alcohol | 13.5 (17% volume) |
| Sugar | 18.0 |
| Emulsifier(SSL) | 0.4 |
| Buffers (Trisodium citrate) | 0.2 |
| Water | 31.06 |

Tables 5 to 7 show a standard 17% alcohol by volume fruit cream liqueur at varying levels of fat. Tables 8 to 12 demonstrate varying amounts of alcohol and fat levels for a hydroalcoholic fat emulsion. Table 13 is an example of a low fat cream liqueur with additional thickener/stabilisers and emulsifier. Table 14 demonstrates the use of the glycoprotein in a cost saving cream liqueur formulation, which is compared to a full fat commercial product using caseinate which is shown in Table 15.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiment hereinbefore described, but may be varied in both construction and detail within the scope of the claims.

The invention claimed is:

1. A hydroalcoholic fat emulsion comprising at least 1% alcohol by volume and at least 1% fat by weight and
   a glycoprotein emulsifier which comprises at least one protein and at least one carbohydrate covalently bonded through a Maillard reaction to cause the chemical bonding of the amine group of the amino acids of the protein and the reducing end of the carbohydrate.

2. A hydroalcoholic fat emulsion as claimed in claim 1 wherein the emulsion comprises in the range of between 0.01% and 10% of the glycoprotein by weight.

3. A hydroalcoholic fat emulsion as claimed in claim 1 wherein the glycoprotein comprises no greater that 6% protein by weight.

4. A hydroalcoholic fat emulsion as claimed in claim 1, wherein the emulsion comprises between 10% and 20% alcohol by volume and between 10% and 25% fat by weight.

5. A hydroalcoholic fat emulsion as claimed in claim 1, having a viscosity in the range of between 5 and 70 centipoises.

6. A hydroalcoholic fat emulsion as claimed in claim 1, wherein the emulsion has a pH of 7 or less.

7. A hydroalcoholic fat emulsion as claimed in claim 1, wherein the emulsion further comprises an acidulate.

8. An emulsifier suitable for use in a hydroalcoholic fat emulsion, wherein the emulsion comprises at least 1% alcohol by volume and at least 1% fat by weight, and
   wherein the emulsifier is a glycoprotein which comprises at least one protein and at least one carbohydrate covalently bonded through a Maillard reaction to cause the chemical bonding of the amine group of the amino acids of the protein and the reducing end of the carbohydrate.

9. An emulsifier as claimed in claim 8, wherein the protein to carbohydrate ratio is in the region of between 1:1 and 1:4.

10. An emulsifier as claimed in claim 8, wherein the glycoprotein comprises α-lactalbumin derived from whey protein and hydrolysed guar gum covalently bonded.

11. An emulsifier as claimed in claim 8, wherein the glycoprotein comprises β-lactoglobulin derived from whey protein and hydrolysed guar gum covalently bonded.

12. An emulsifier as claimed in claim 8, wherein the emulsion comprises between 10% and 20% alcohol by volume and between 10% and 25% fat by weight.

13. An emulsifier as claimed in claim 8, wherein the emulsion has a pH of 7 or less.

14. An emulsifier as claimed in claim 8, wherein the emulsion further comprises an acidulate.

15. Use of a glycoprotein, comprising at least one protein and at least one carbohydrate covalently bonded through a Maillard reaction to cause the chemical bonding of the amine group of the amino acids of the protein and the reducing end of the carbohydrate as an emulsifier in a hydroalcoholic fat emulsion, wherein the emulsion comprises at least 1% alcohol by volume and at least 1% fat by weight.

16. Use of a glycoprotein as claimed in claim 15, wherein the protein to carbohydrate ratio is in the region of between 1:1 and 1:4.

17. Use of a glycoprotein as claimed in claim 15, wherein the glycoprotein comprises α-lactalbumin derived from whey protein and hydrolysed guar gum covalently bonded.

18. Use of a glycoprotein as claimed in claim 15, wherein the glycoprotein comprises β-lactoglobulin derived from whey protein and hydrolysed guar gum covalently bonded.

19. Use of a glycoprotein as claimed in claim 15, wherein the emulsion comprises between 10% and 20% alcohol by volume and between 10% and 25% fat by weight.

20. Use of a glycoprotein as claimed in claim 15, wherein the emulsion has a pH of 7 or less.

* * * * *